United States Patent
Takahashi et al.

(10) Patent No.: US 8,903,417 B2
(45) Date of Patent: Dec. 2, 2014

(54) MOBILE TERMINAL AND CONTROL METHOD THEREFOR

(75) Inventors: Makoto Takahashi, Yokosuka (JP); Jun Hashimoto, Yokohama (JP); Kentaro Itagaki, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 197 days.

(21) Appl. No.: 13/517,913

(22) PCT Filed: Dec. 7, 2010

(86) PCT No.: PCT/JP2010/071908
§ 371 (c)(1),
(2), (4) Date: Jun. 20, 2012

(87) PCT Pub. No.: WO2011/096130
PCT Pub. Date: Aug. 11, 2011

(65) Prior Publication Data
US 2012/0258734 A1  Oct. 11, 2012

(30) Foreign Application Priority Data
Feb. 3, 2010  (JP) .................................. 2010-021942

(51) Int. Cl.
*H04W 24/00* (2009.01)
*H04M 1/725* (2006.01)
*H04W 4/02* (2009.01)

(52) U.S. Cl.
CPC ............ *H04W 4/02* (2013.01); *H04M 1/72572* (2013.01); *H04W 61/00* (2013.01)
USPC .................. 455/456.1; 455/404.2; 455/414.2; 455/456.3

(58) Field of Classification Search
CPC .......... H04W 64/00; H04W 4/02; H04W 8/08
USPC ........... 455/456.1–456.6, 404.2, 414.1–414.2
See application file for complete search history.

(56) References Cited

U.S. PATENT DOCUMENTS

2007/0005188 A1* 1/2007 Johnson ........................ 700/245
2009/0005076 A1* 1/2009 Forstall et al. ............. 455/456.2

FOREIGN PATENT DOCUMENTS

| | | |
|---|---|---|
| CN | 1499882 A | 5/2004 |
| JP | 8 138193 | 5/1996 |

(Continued)

OTHER PUBLICATIONS

Office Action issued Apr. 30, 2013 in Japanese Patent Application No. 2010-021942 (with English-language translation).

(Continued)

*Primary Examiner* — Wayne Cai
(74) *Attorney, Agent, or Firm* — Oblon, Spivak, McClelland, Maier & Neustadt, L.L.P.

(57) ABSTRACT

A mobile terminal receives information adapted to the current location of the mobile terminal via a mobile communication network from an information service providing communication apparatus that sends information adapted to current locations of mobile terminals to mobile terminals. The mobile terminal repeats identifying the location of the mobile terminal, and calculates a linear movement distance of the mobile terminal between a past location of the mobile terminal and the current location of the mobile terminal. The mobile terminal transmits a signal indicating the current location if the linear movement distance is greater than a threshold, but does not transmit the signal indicating the current location if the linear movement distance is less than the threshold.

5 Claims, 5 Drawing Sheets

(56) References Cited

FOREIGN PATENT DOCUMENTS

| | | |
|---|---|---|
| JP | 9 274697 | 10/1997 |
| JP | 2000 339593 | 12/2000 |
| JP | 2005 317037 | 11/2005 |
| JP | 2009 135915 | 6/2009 |
| JP | 2009 267886 | 11/2009 |
| JP | 2009 294000 | 12/2009 |

OTHER PUBLICATIONS

International Search Report Issued Feb. 15, 2011 in PCT/JP10/71908 Filed Dec. 7, 2010.

Combined Chinese Office Action and Search Report issued Feb. 26, 2014 in Patent Application No. 201080060409.2 (with English language translation).

* cited by examiner

MOBILE TERMINAL AND CONTROL METHOD THEREFOR

TECHNICAL FIELD

The present invention relates to mobile terminals and to control methods therefore.

BACKGROUND ART

A scheme is known for a mobile terminal, such as a mobile phone handset, that communicates via a mobile communication network, for identifying the location of the mobile terminal itself using GPS (global positioning system) (for example, see Patent Document 1).

The assignee of the present patent application has developed in Japan a scheme in which a mobile terminal identifies the location of the mobile terminal itself periodically and automatically, and reports the location of the mobile terminal to an information service providing apparatus. Based on the location of the mobile terminal, the information service providing apparatus can send to the mobile terminal a piece of information related to a region including the location, for example, the weather forecast of the region.

Patent Document 1: JP-A-2009-294000

SUMMARY OF THE INVENTION

However, if a mobile terminal reports the location of the mobile terminal periodically and automatically to an information service providing apparatus, it will be understood that the power consumption of the mobile terminal is enormous and that the traffic load is also huge.

Accordingly, the present invention provides a mobile terminal and a method for controlling a mobile terminal that reports the location of the mobile terminal to an information service providing apparatus with less power consumption and less traffic load.

A mobile terminal according to the present invention includes a receiver adapted for receiving information adapted to a current location of the mobile terminal via a mobile communication network from an information service providing communication apparatus that sends information adapted to current locations of mobile terminals to mobile terminals; a transmitter adapted for transmitting signals to the information service providing communication apparatus; a locator adapted for repeating identifying a location of the mobile terminal; a linear movement distance calculator adapted for calculating a linear movement distance of the mobile terminal between a past location of the mobile terminal and a current location of the mobile terminal; a comparative determiner adapted for determining whether or not the linear movement distance calculated by the linear movement distance calculator is greater than a threshold; and a current location signal transmission regulator adapted for regulating the transmitter, so that the transmitter transmits a signal indicating the current location of the mobile terminal identified by the locator if the comparative determiner has determined that the linear movement distance is greater than the threshold, the current location signal transmission regulator adapted for regulating the transmitter, so that the transmitter does not transmit the signal indicating the current location if the comparative determiner has determined that the linear movement distance is less than the threshold.

A method for controlling a mobile terminal according to the present invention includes: repeating identifying a location of the mobile terminal; calculating a linear movement distance of the mobile terminal between a past location of the mobile terminal and a current location of the mobile terminal; determining whether or not the linear movement distance is greater than a threshold; regulating the transmitter, so that the transmitter transmits a signal indicating the current location of the mobile terminal identified by the locator if it has been determined that the linear movement distance is greater than the threshold, and the transmitter does not transmit the signal indicating the current location if it has been determined that the linear movement distance is less than the threshold; and receiving information adapted to the current location of the mobile terminal via a mobile communication network from an information service providing communication apparatus that sends information adapted to current locations of mobile terminals to mobile terminals.

In the present invention, if the linear movement distance of the mobile terminal is greater than a threshold, the mobile terminal transmits a signal indicating the current location of the mobile terminal to the information service providing communication apparatus. On the other hand, if the linear movement distance is less than the threshold, the mobile terminal does not transmit the signal indicating the current location. Thus, the notification of current location of the mobile terminal to the information service providing apparatus is regulated, so that the number of times notification is given is reduced. Accordingly, power consumption of the mobile terminal can be restrained, and the traffic load can be reduced.

Preferably, the mobile terminal may further include: a memory adapted for storing the past location of the mobile terminal; a transmission-success-failure determiner adapted for determining whether or not transmission of the signal indicating the current location has been successfully completed by the transmitter; and a past location recorder adapted for recording in the memory the current location of the mobile terminal identified by the locator as the past location of the mobile terminal if the transmission-success-failure determiner determines that the transmission of the signal indicating the current location has been successfully completed, in which the past location recorder is adapted for not recording in the memory the current location of the mobile terminal identified by the locator if the transmission-success-failure determiner determines that the transmission of the signal indicating the current location has failed.

In this case, when the mobile terminal is located in a region in which it can communicate wirelessly with the mobile communication network, the location of the mobile communication terminal measured by the locator is recorded in the memory since the transmission of the signal indicating the current location has been successfully completed. However, when the mobile terminal is located in a region in which it cannot communicate wirelessly with the mobile communication network, the location of the mobile communication terminal measured by the locator is not recorded in the memory. As a result, the next calculation of the linear movement distance is based on the past location of the mobile terminal, which is the last location at which wireless communication could be made, and the notification of the location to the information service providing apparatus was successful. The location of the mobile terminal in the region where the mobile terminal cannot communicate wirelessly is not used as a basis of the next calculation of the linear movement distance. If the linear distance between a previous location identified by the locator when the mobile terminal was located in a region in which it can communicate wirelessly with the mobile communication network and a new location identified by the locator when the mobile terminal is located in a region in which it can communicate wirelessly with the mobile communication network is greater than a threshold, the mobile terminal reports the new location to the information service providing apparatus. Consequently, after movement of the mobile terminal from a region in which wireless communication is impossible to another region in which wireless communication is possible, the mobile terminal can make an early notification of the new location to the information service providing apparatus.

Preferably, the mobile terminal may further include a movement status determiner adapted for assuming a movement status of the mobile terminal, the movement status determiner adapted for determining whether or not to permit the locator to identify the location of the mobile terminal on the basis of assumption of the movement status by the movement status determiner. In this case, when the mobile terminal has been stationary or has moved only a short distance, the locator is disabled from identifying the location of the mobile terminal and the power consumption involved in identifying the location can be restrained.

DESCRIPTION OF EMBODIMENTS

Figure 1:
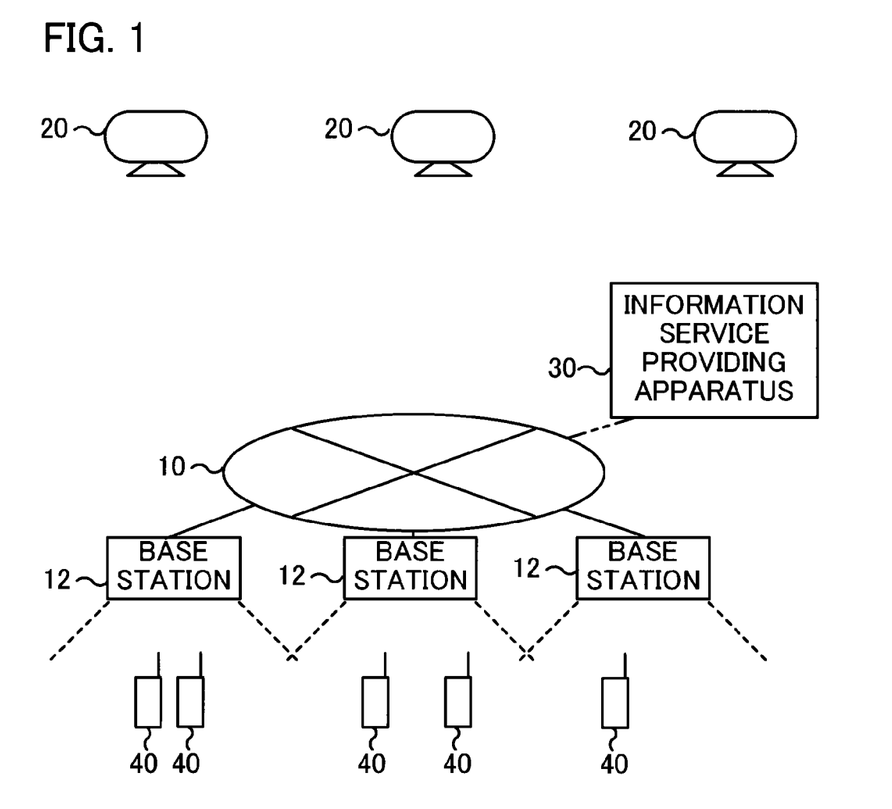
FIG. 1 is a schematic view showing an overall communication system in which a mobile terminal according to an embodiment of the present invention is used.

With reference to the accompanying drawings, an embodiment according to the present invention will be described hereinafter. As shown in FIG. 1, an overall communication system in which a mobile terminal according to the embodiment is used includes a mobile communication network 10 and multiple mobile terminals 40 communicable with the mobile communication network 10. The mobile communication network 10 includes multiple base stations 12, each of which communicates with mobile terminals 40 in the cell of the base station 12.

Each mobile terminal 40 is, for example, a mobile phone handset or another type of terminal that can use the mobile communication network. Each mobile terminal 40 receives time signals from multiple (for example, three) GPS satellites 20, and identifies the current location of the mobile terminal 40 itself on the basis of the time signals.

An information service providing communication apparatus 30 is connected directly or indirectly with the mobile communication network 10. For example, the information service providing apparatus 30 may communicate with one of the base stations 12 via radio waves. Alternatively, the information service providing apparatus 30 may be connected via cable with another network that is also connected with the mobile communication network 10.

The information service providing apparatus 30 is a communication apparatus used by an information service provider for providing information services to users. In FIG. 1, a single information service providing apparatus 30 is illustrated, but multiple information service providing apparatuses 30 may exist.

The mobile terminal 40 transmits to the information service providing apparatus 30 a signal indicating the current location of the mobile terminal 40 identified with the GPS as described above. The information service providing apparatus 30 seeks information adapted to the current location of the mobile terminal 40, and sends the obtained information to the mobile terminal 40 via the mobile communication network 10.

Figure 2:
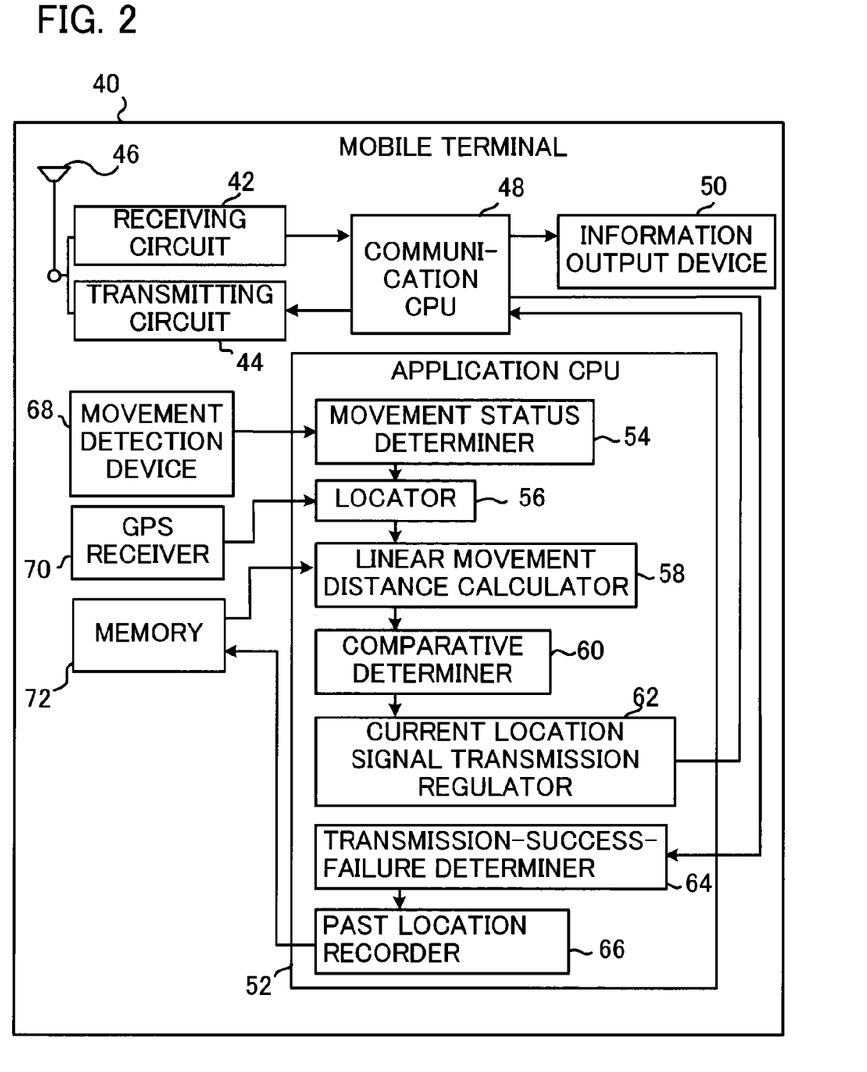
FIG. 2 is a block diagram showing the architecture of the mobile terminal.

As shown in FIG. 2, the mobile terminal 40 includes a receiving circuit 42, a transmitting circuit 44, an antenna 46, and a communication CPU (central processing unit) 48. Under control of the communication CPU 48, the receiving circuit 42 processes signals received by the antenna 46 from another communication apparatus (for example, the information service providing apparatus 30) via the mobile communication network 10. Under control of the communication CPU 48, the transmitting circuit 44 transmits signals using the antenna 46 to another communication apparatus (for example, the information service providing apparatus 30) via the mobile communication network 10. Following a communication control program, the communication CPU 48 controls the process of reception signals at the receiving circuit 42 and the process of transmission signals at the transmitting circuit 44. Thus, the receiving circuit 42 and the communication CPU 48 serves as a receiver, whereas the transmitting circuit 44 and the communication CPU 48 serves as a transmitter.

The mobile terminal 40 further includes an information output device 50. The information output device 50 is, for example, a display device or a sound generating device, which outputs information conforming to reception signals on the basis of reception signals processed by the receiving circuit 42 and the communication CPU 48. That is to say, the information output device 50 displays a message or emits messaging sounds.

The mobile terminal 40 further includes an application CPU 52. The application CPU 52 executes various functions that are not directly related to the receiving circuit 42 and the transmitting circuit 44. The application CPU 52 includes a movement status determiner 54, a locator 56, a linear movement distance calculator 58, a comparative determiner 60, a current location signal transmission regulator 62, a transmission-success-failure determiner 64, and a past location recorder 66. The movement status determiner 54, the locator 56, the linear movement distance calculator 58, the comparative determiner 60, and the current location signal transmission regulator 62 can be realized by which the application CPU 52 executes a computer program and operates according to the computer program.

The mobile terminal 40 further includes a movement detection device 68, a GPS receiver 70, and a memory 72. The movement detection device 68 is a device for detecting a movement status of the mobile terminal 40, for example, an acceleration sensor that measures acceleration exerted on the mobile terminal 40, a geomagnetic sensor that measures geomagnetism at the position of the mobile terminal 40, or a combination thereof. If the movement detection device 68 is an acceleration sensor, the movement status determiner 54 of the application CPU 52 counts the number of steps of the user of the mobile terminal 40 on the basis of the acceleration measured by the movement detection device 68, and calculates the walking distance by multiplying the number of steps by the length of stride of the user stored in advance. The number of steps or the walking distance may be compensated by the measurements of the geomagnetic sensor. The time at which calculation of the walking distance starts is not limited, and may be, for example, the time at step S8 that will be described later. The movement status determiner 54 compares the walking distance with a threshold, and thereby determines whether the mobile terminal 40 is moving or stationary. More specifically, if the walking distance is greater than the threshold (the mobile terminal 40 is moving), the movement status determiner 54 enables the locator 56 to identify the location of the mobile terminal 40. However, if the walking distance is less than the threshold (the mobile terminal 40 is stationary), the movement status determiner 54 disables the locator 56 from identifying the location of the mobile terminal 40. In this case, the threshold may be the same as or different from a threshold X that is compared with the linear movement distance that will be described later.

The GPS receiver 70 receives time signals from multiple GPS satellites 20. When the movement status determiner 54 permits, the locator 56 of the application CPU 52 identifies the current location of the mobile terminal 40 itself on the basis of the time signals received by the GPS receiver 70. The locator 56 may determine the current location of the mobile terminal 40 on the basis of the location information of the GPS satellites 20 received by the GPS receiver 70 from the GPS satellites 20 and the time signals received by the GPS receiver 70 from the GPS satellites 20 (autonomous GPS positioning). Alternatively, the locator 56 may determine the current location of the mobile terminal 40 on the basis of the location information of the GPS satellites 20 received by the transmitting circuit 44 via the mobile communication network 10 from a satellite location information server (not shown) and the time signals received by the GPS receiver 70 from the GPS satellites 20 (assisted GPS positioning).

The memory 72 stores location history data. The location history data describes a past location of the mobile terminal 40 identified by the locator 56. The past location recorder 66 of the application CPU 52 adds to the past location history data the current location of the mobile terminal 40 identified by the locator 56 as a past location.

The linear movement distance calculator 58 of the application CPU 52 calculates the linear movement distance of the mobile terminal 40, which is the linear distance between the last location and the current location of the mobile terminal 40, in which the last position is previously identified by the locator 56 and recorded in the memory 72 whereas the current location is currently identified by the locator 56. The comparative determiner 60 of application CPU 52 compares the linear movement distance of the mobile terminal 40 calculated by the linear movement distance calculator 58 with a threshold X. In other words, the comparative determiner 60 decides whether or not the linear movement distance is greater than the threshold.

If the comparative determiner 60 determines that the linear movement distance is greater than the threshold, the current location signal transmission regulator 62 of the application CPU 52 provides information indicative of the current location of the mobile terminal 40 identified by the locator 56 to the communication CPU 48. Then, the communication CPU 48 generates a signal indicating the current location destined for the information service providing apparatus 30, and sends the signal by the transmitting circuit 44. On the other hand, if the comparative determiner 60 determines that the linear movement distance is less than the threshold, the current location signal transmission regulator 62 does not provide the information indicative of the current location of the mobile terminal 40 identified by the locator 56 to the communication CPU 48, whereby the signal indicating the current location is not transmitted. Thus, the current location signal transmission regulator 62 regulates the communication CPU 48, so that the communication CPU 48 transmits the signal indicating the current location if the linear movement distance has been great, but does not transmit the signal indicating the current location if the linear movement distance has been small.

The communication CPU 48 determines whether or not the transmission of the signal indicating the current location of the mobile terminal 40 to the information service providing communication apparatus 30 has been successfully completed, and notifies the application CPU 52 of the determination result. The transmission-success-failure determiner 64 of the application CPU 52 refers to the determination result.

Figure 3:
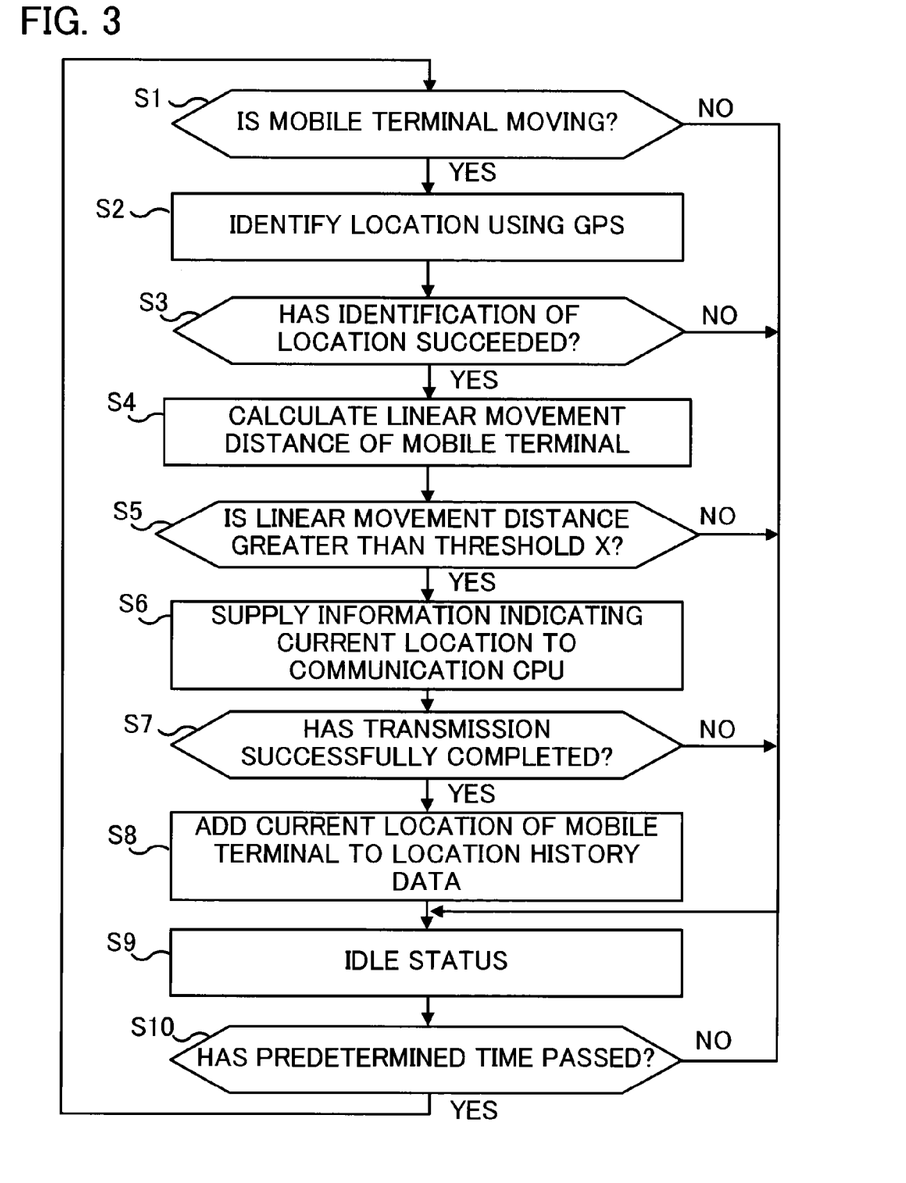
FIG. 3 is a flow chart showing an operation of the mobile terminal.

Next, with reference to the flow chart in FIG. 3, an operation of the mobile terminal 40 will be described. The operation is realized by the application CPU 52 executing a computer program corresponding to the flow chart in FIG. 3.

At step S1, the movement status determiner 54 determines whether the mobile terminal 40 is moving or stationary. More specifically, the movement status determiner 54 determines whether or not the calculated walking distance is greater than a threshold. If the walking distance is greater than the threshold, the operation proceeds to step S2. Otherwise, the operation proceeds to step S9, in which the application CPU 52 transitions to an idle status.

At step S2, the locator 56 identifies the current location of the mobile terminal 40 using the GPS. At step S3, it is determined whether or not the identification of the location has succeeded. If it has succeeded, the operation proceeds to step S4. Otherwise, the operation proceeds to step S9, in which the application CPU 52 transitions to the idle status.

At step S4, the linear movement distance calculator 58 calculates the linear movement distance of the mobile terminal 40 on the basis of the last location of the mobile terminal 40 stored in the memory 72, and the current location of the mobile terminal 40 currently identified by the locator 56.

At step S5, the comparative determiner 60 compares the linear movement distance of the mobile terminal 40 calculated by the linear movement distance calculator 58 with the threshold X. In other words, the comparative determiner 60 determines whether or not the linear movement distance is greater than the threshold X. The threshold X may be set to, for example, 40 meters, or another value. If the linear movement distance is greater than the threshold X, the operation proceeds to step S6.

Otherwise, the operation proceeds to the idle status of step S9. If the linear movement distance is less than the threshold X, the information indicating the current location of the mobile terminal 40 is discarded without additively recorded in the memory 72. As a result, the next calculation of the linear movement distance (step S4) will be based on the last location of the mobile terminal 40 that is also used for the current calculation of the linear movement distance.

At step S6, the current location signal transmission regulator 62 supplies the information indicating the current location of the mobile terminal 40 to the communication CPU 48. As a result, the communication CPU 48 generates a signal indicating the current location destined for the information service providing apparatus 30, and transmits the signal by the transmitting circuit 44.

At step S7, the application CPU 52 determines whether or not the transmission of the signal indicating the current location has been successfully completed. More specifically, the communication CPU 48 determines whether or not the transmission of the signal has been successfully completed, and provides the determination result to the application CPU 52.

The communication CPU 48 determines that the transmission of the signal has failed when the signal cannot be sent out, or an acknowledgement is not received although the signal could be sent out. These situations occur, for example, when the mobile terminal 40 is located where it cannot communicate with the mobile communication network 10 by radio waves. If an acknowledgement from the mobile communication network 10 is received, the communication CPU 48 determines that the transmission of the signal has been successfully completed.

If the determination result by the communication CPU 48 indicates the successful transmission, the transmission-success-failure determiner 64 of the application CPU 52 proceeds with the operation to step S7. Otherwise, the transmission-success-failure determiner 64 proceeds with the operation to the idle status of step S9. At step S8, the past location recorder 66 of the application CPU 52 updates the location history data in the memory 72, in such a manner that the current location of the mobile terminal 40 identified by the locator 56 is added to the location history data. Thus, if the transmission of the signal indicating the location has succeeded, the current location of the mobile terminal 40 is added to the location history data in the memory 72 as the past location of the mobile terminal 40.

On the other hand, if the transmission of the signal indicating the location has failed, the information indicative of the current location of the mobile terminal 40 is not added to the memory 72 and is discarded. As a result, the next calculation of the linear movement distance (step S4) will be based on the past location of the mobile terminal 40 that is the last location when the notification of the location to the information service providing communication apparatus 30 last succeeded. The location of the mobile terminal 40 identified when the mobile terminal 40 is located in a region where it cannot communicate by radio waves is not used as a basis for the next calculation of the linear movement distance. Even if the location identification by the locator using the GPS is repeated for the mobile terminal 40 that cannot communicate wirelessly with the mobile communication network 10, the information indicating the location of the mobile terminal 40 identified in such a situation is discarded. In other words, the mobile terminal 40 reports the new location of the mobile terminal 40 to the information service providing communication apparatus 30 if the linear distance between a previous location identified by the locator 56 in which the mobile terminal 40 could communicate wirelessly with the mobile communication network 10 and a new location identified by the locator 56 in which the mobile terminal 40 can communicate wirelessly with the mobile communication network 10 is greater than the threshold X. Consequently, after movement of the mobile terminal 40 from a region at which wireless communication is impossible with another region at which wireless communication is possible, the mobile terminal 40 can make an early notification of the new location to the information service providing apparatus 30. However, it is optional whether or not updating of the location history data is conducted in response to the successful transmission of the signal indicating the location.

In the idle status of step S9, the application CPU 52 stops almost all functions thereof, and restarts if a predetermined event occurs. The application CPU 52 includes a timer (not shown), which continues timekeeping even in the idle status. Whenever a predetermined time (for example, five minutes) has passed (step S10), the application CPU 52 restarts, and the operation returns to step S1. Thus, at regular intervals, the application CPU 52 starts to execute the above-described operation. However, the predetermined time at step S10 may be replaced with a variable time, so that the above-described operation may be performed at irregular intervals.

Figure 4:
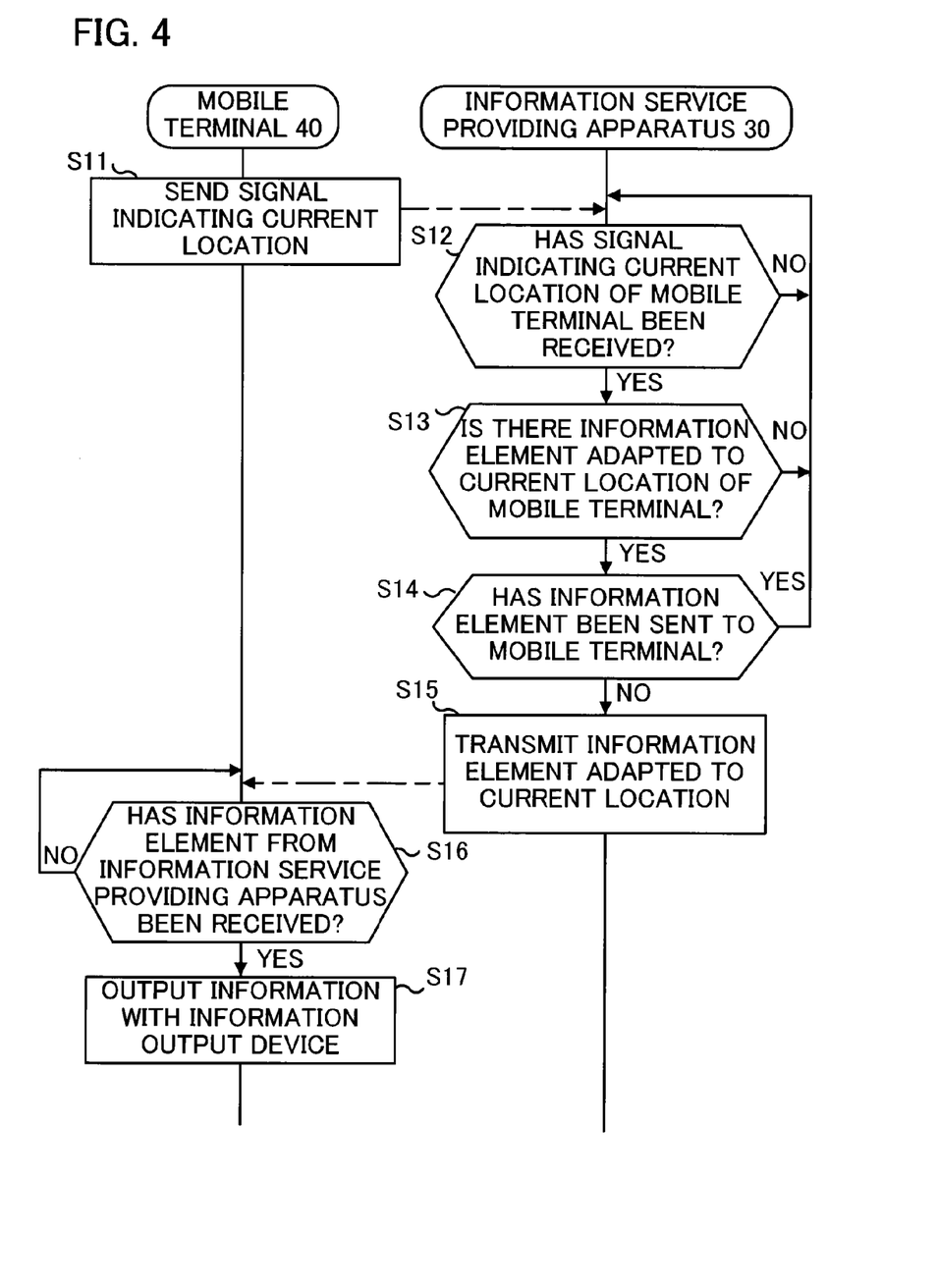
FIG. 4 is a sequence diagram showing operations of the mobile terminal and an information service providing apparatus 30 shown in FIG. 1.

With reference to FIG. 4, a cooperative operation of the mobile terminal 40 and the information service providing apparatus 30. As described above, the current location signal transmission regulator 62 of the application CPU 52 supplies information indicative of the current location of the mobile terminal 40 (step S6 in FIG. 3). As a result, the communication CPU 48 sends a signal indicating the current location of the mobile terminal 40 to the information service providing apparatus 30 by the transmitting circuit 44 (step S11 in FIG. 4).

Upon receiving the signal indicating the current location of the mobile terminal 40 (step S12), the information service providing apparatus 30 searches a database (not shown) therein for information elements related to a region including the current location of the mobile terminal 40 that is the source of the signal. Such information elements may include, for example, the weather forecast of the region, advertisement of a shop or restaurant in the region, public relations of an entertainment event scheduled to be held in the region, and the notification of time of the last train at the railway station in the region. The database of the information service providing apparatus 30 stores these information elements for each region. Preferably, an effective time duration may be added to each information element, so that the information elements may be deleted from the database or cannot be searched for after the effective time durations.

At step S13, the information service providing apparatus 30 determines whether or not there is an information element related to the region including the current location of the mobile terminal 40 (i.e., information element adapted to the current location of the mobile terminal). If the determination at step S13 is affirmative, at step S14, the information service providing apparatus 30 determines whether or not the information element has been sent to the mobile terminal. If the determination at step S14 is negative, at step S15, the information service providing apparatus 30 transmits the information element to the mobile terminal 40. By the determination at step S14, it is possible to prevent retransmission of an information element that was sent a short time before from the information service providing apparatus 30, when, for example, the mobile terminal 40 transmits a signal indicating a previous location by returning to the previous location in only a short time.

Upon receiving the information element from the information service providing apparatus 30, the communication CPU 48 of the mobile terminal 40 (step S16), the communication CPU 48 causes the information output device 50 to output the information (step S17). That is to say, the information output device 50 displays a message or picture, or emits a messaging sound. Therefore, the user of the mobile terminal 40 knows the above-mentioned information, such as a weather forecast, advertisement, or public announcement.

In accordance with the embodiment, if the linear movement distance of the mobile terminal 40 is greater than the threshold X, the mobile terminal 40 transmits the signal indicating the current location of the mobile terminal to the information service providing communication apparatus 30, but if the linear movement distance is less than the threshold X, the mobile terminal 40 does not sends a signal indicating the current location. Since the report of the current location of the mobile terminal 40 to the information service providing apparatus 30 is thus regulated, the number of times of report is reduced, so that the power consumption of the mobile terminal 40 can be restrained.

The power consumption necessary for calculating the location of the mobile terminal 40 by processing the information received from the GPS satellites 20 in the above-mentioned autonomous GPS positioning is small. On the other hand, reporting of the location to the information service providing apparatus 30 involves signal generation and transmission, so that it is necessary to consume much power. Accordingly, reduction in the number of times of report of the location from the mobile terminal 40 results in effective reduction in power consumption of the mobile terminal 40.

In assisted GPS positioning, considerable power is consumed due to intercommunication with the satellite location information server in addition to the calculation of the location of the mobile terminal 40. However, even in this case, reduction in the number of times of report of the location from the mobile terminal 40 results in reduction in power consumption of the mobile terminal 40.

Furthermore, in accordance with this embodiment, by regulating the report of the current location of the mobile terminal 40 to the information service providing apparatus 30, the number of times of report is reduced, so that traffic load can be reduced.

Figure 5:
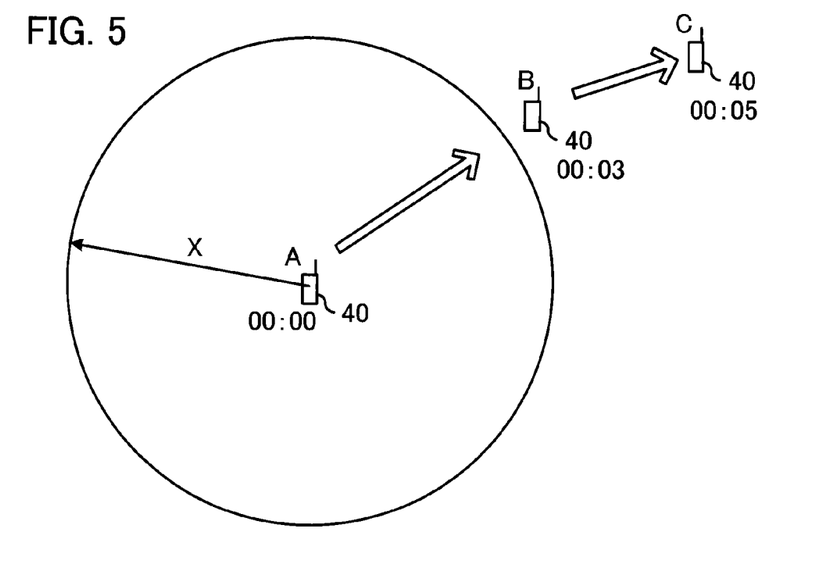
FIG. 5 is a schematic view showing a specific advantage of the embodiment.
Figure 6:
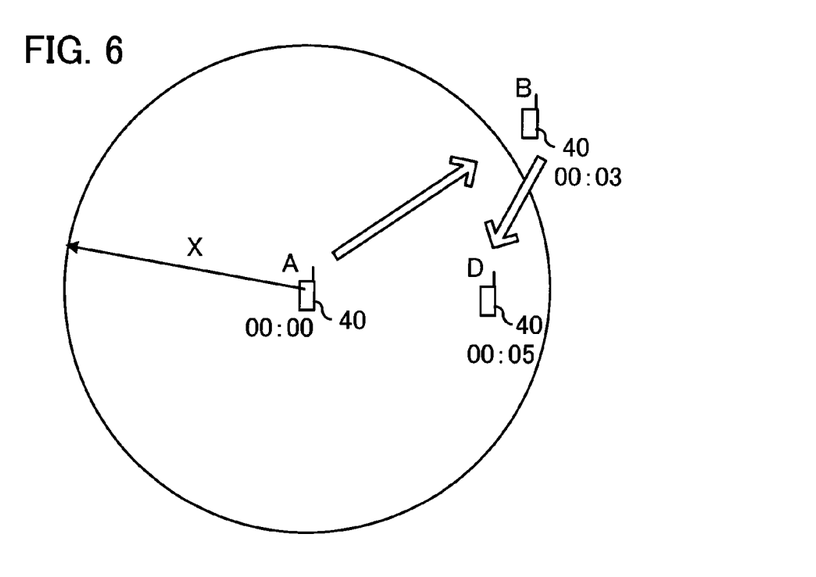
FIG. 6 is a schematic view showing a specific advantage of the embodiment.

Let us assume that mobile terminal 40 determines the location of the mobile terminal 40 at location A in FIGS. 5 and 6, and sends the information of the location A to the information service providing apparatus 30. As shown in FIG. 5, let us assume that three minutes later the mobile terminal 40 exists at location B that is different from the previous location A by a distance that is greater than the threshold X (for example, 40 meters), and that at a predetermined time (for example, five minutes) later the mobile terminal 40 exists at location C that is different from the previous location A by a distance that is greater than the threshold X. At location C, the mobile terminal 40 identifies the location of the mobile terminal 40. Since the linear movement distance from location A to location C is greater than the threshold X, the mobile terminal 40 transmits the location information to the information service providing apparatus 30. In response to the location information, information service providing apparatus 30 sends to the mobile terminal 40 an information element that is adapted to the location C if there is such an information element.

On the other hand, as shown in FIG. 6, let us assume that the mobile terminal 40 exists at location D that is different from the previous location A by a distance that is shorter than the threshold X, the predetermined time (for example, five minutes) after the time point when the mobile terminal 40 was located at location A. At location D, the mobile terminal 40 identifies the location of the mobile terminal 40. However, the mobile terminal 40 does not transmit the location information to the information service providing apparatus 30. Even if the mobile terminal 40 visits location B temporarily along the way, the linear movement distance from location A to location D is shorter than the threshold X. Inevitably, the information service providing apparatus 30 does not return the information element adapted to location D to the mobile terminal 40. For example, if the user of the mobile terminal 40 reciprocates in a short time, the mobile terminal 40 does not send the information of the location (temporary destination) to the information service providing apparatus 30.

Furthermore, by providing the determination of step S3 (FIG. 3), if the mobile terminal 40 is located in an environment where it is impossible to determine the location using the GPS (for example, an indoor environment in which electromagnetic waves from the outside are degraded), the mobile terminal 40 does not send the information of the location (temporary destination) to the information service providing apparatus 30. However, it is optional whether or not the determination of step S3 should be provided.

Hereinbefore, an embodiment according to the present invention has been described, but the following modifications also fall within the scope of the present invention.

In the above-described embodiment, the locator 56 identifies the location of the mobile terminal 40 using signals from a plurality of GPS satellites 20 (step S2). In an alternative embodiment, the locator 56 may identify the location of the mobile terminal 40 using multiple (for example, three) base stations. Alternatively, the locator 56 may identify the location of the mobile terminal 40 using a signal from a single GPS satellite 20 and signals from two base stations. Alternatively, the locator 56 may identify the location of the mobile terminal 40 using signals from two GPS satellites 20 and a signal from a single base station.

In the above-described embodiment, the movement status determiner 54 of the application CPU 52 decides whether or not the walking distance of the user owing the mobile terminal 40 is greater than a threshold, and permits the locator 56 to identify the location if the walking distance is greater than the threshold (steps S1 and S2). In an alternative embodiment, the application CPU 52 may calculate the travelling distance of the mobile terminal 40 by executing an integral treatment on the basis of acceleration measured continually by the movement detection device 68. In this case, the movement status determiner 54 may permit the locator 56 to identify the location if the mobile terminal 40 travels over a distance that is greater than the threshold from the mobile terminal 40 sent the location information to the information service providing apparatus 30 last. In this case, the threshold may be the same as or different from the threshold X that is compared with the linear movement distance.

In a further alternative embodiment, the movement status determiner 54 of the application CPU 52 may determine whether the mobile terminal 40 is moving or stationary by comparing the instantaneous value of acceleration measured by the movement detection device 68 with a threshold. More specifically, if the instantaneous value of acceleration measured by the movement detection device 68 is greater than the threshold, the movement status determiner 54 may enable the locator 56 to identify the location of the mobile terminal 40, but if the instantaneous value of acceleration measured by the movement detection device 68 is less than the threshold, the movement status determiner 54 may disable the locator 56 from identifying the location of the mobile terminal 40.

In a further alternative embodiment, the movement status determiner 54 of the application CPU 52 may determine whether the mobile terminal 40 is moving or stationary by comparing the change in geomagnetism measured by the movement detection device 68 with a threshold.

In an alternative embodiment, the movement status determiner 54 of the application CPU 52 may permit the locator 56 to identify the location of the mobile terminal 40 when the mobile terminal 40 travels from a previous cell or sector to another cell or sector. That is to say, the movement status determiner 54 may permit the locator 56 to identify the location as a consequence of the start or end of inter-cell handover or inter-sector handover. In this case, the movement detection device 68, such as an acceleration sensor, is not necessary.

In the above-described preferred embodiment and alternative embodiments, the locator 56 is permitted to determine the location if the mobile terminal 40 is moving or the movement distance is great (steps S1 and S2). However, in an alternative embodiment, regardless of movement of the mobile terminal, the mobile terminal 40 may identify the location at regular or random time intervals as long as the power source is activated.

In this case, the movement detection device 68, such as an acceleration sensor, is not necessary.

In the above-described embodiment, the linear movement distance of the mobile terminal 40 is the distance between the current and past locations of the mobile terminal 40 identified by the locator 56. However, in an alternative embodiment, it is possible to provide a tridimensional acceleration sensor, and to calculate the linear movement distance from the point at which the mobile terminal 40 sends the location information to the information service providing apparatus 30 last to the point at which the locator 56 identifies the current location by means of an integral treatment based on the acceleration measured continually by the sensor taking account of the movement direction. The tridimensional acceleration sensor may be the same as the movement detection device 68.

In the above-described embodiment, the threshold X to be compared with the linear movement distance of the mobile terminal 40 is a constant. However, in an alternative embodiment, the application CPU 52 of the mobile terminal 40 may change the threshold X on the basis of the location of the mobile terminal 40 (for example, the location identified by the locator 56 or the base station to which the mobile terminal 40 communicates). For example, in urban regions where there are may shops and many restaurants, the application CPU 52 sets the threshold X to be small, thereby increasing the frequency of report of the location of the mobile terminal 40 to the information service providing apparatus 30. In other regions, the threshold X may be set large, thereby decreasing the frequency of report of the location of the mobile terminal 40. In a further alternative embodiment, base stations to which the mobile terminal 40 communicate may send instructions to the mobile terminal 40 for changing the threshold X, and the mobile terminal 40 may change the threshold X in response to the instructions.

In the above-described embodiment, the mobile terminal 40 includes two CPUs 48 and 52. However, in an alternative embodiment, the mobile terminal 40 may include a single processor that has the functions of the communication CPU 48 and the application CPU 52, or may include many more processors.

Functions achieved by the communication CPU 48 and the application CPU 52 may be achieved by hardware or a programmable logic device, such as an FPGA (Field Programmable Gate Array) or a DSP (Digital Signal Processor), instead of the CPU.

The above-described modifications may be combined unless they are conflicting.

REFERENCE SYMBOLS

10: mobile communication network
12: base station
20: GPS satellite
30: information service providing apparatus
40: mobile terminal
42: receiving circuit (receiver)
44: transmitting circuit (transmitter)
48: communication CPU (receiver, transmitter)
52: application CPU
54: movement status determiner
56: locator
58: linear movement distance calculator
60: comparative determiner
62: current location signal transmission regulator
64: transmission-success-failure determiner
66: past location recorder
72: memory

What is claimed is:

1. A mobile terminal comprising:
   circuitry configured to
      receive information adapted to a current location of the mobile terminal via a mobile communication network from an information service providing communication apparatus that sends information adapted to current locations of mobile terminals to mobile terminals;
      transmit signals to the information service providing a communication apparatus;
      identify a location of the mobile terminal;
      calculate a linear movement distance of the mobile terminal between a past location of the mobile terminal and a current location of the mobile terminal;
      determine whether the linear movement distance is greater than a threshold;
      transmit a signal indicating the current location of the mobile terminal if it is determined that the linear movement distance is greater than the threshold, and not transmit the signal indicating the current location if it is determined that the linear movement distance is less than the threshold;
      store the past location of the mobile terminal;
      determine that transmission of the signal indicating the current location has been successfully completed when an acknowledgement of the signal indicating the current location is received;
      determine that transmission of the signal indicating the current location has failed when the signal indicating the current location cannot be transmitted, or an acknowledgement is not received although the signal indicating the current location was transmitted; and
      store the current location of the mobile terminal as the past location of the mobile terminal if it is determined that the transmission of the signal indicating the current location has been successfully completed, and not store the current location of the mobile terminal if it is determined that the transmission of the signal indicating the current location has failed.

2. The mobile terminal according to claim 1, wherein the circuitry is configured to:
   assume a movement status of the mobile terminal; and
   determine whether to identify the location of the mobile terminal on the basis of assumption of the movement status.

3. The mobile terminal according to claim 1, wherein the circuitry is configured to change the threshold based on a location of the mobile terminal.

4. A method for controlling a mobile terminal used in the mobile terminal comprising:
   identifying a location of the mobile terminal;
   calculating a linear movement distance of the mobile terminal between a past location of the mobile terminal and a current location of the mobile terminal;
   determining whether the linear movement distance is greater than a threshold;
   regulating a transmitter, so that the transmitter transmits a signal indicating the current location of the mobile terminal if it is determined that the linear movement distance is greater than the threshold, and so the transmitter does not transmit the signal indicating the current location if it has been determined that the linear movement distance is less than the threshold;
   receiving information adapted to the current location of the mobile terminal via a mobile communication network from an information service providing communication apparatus that sends information adapted to current locations of mobile terminals to mobile terminals;

determining that transmission of the signal indicating the current location has been successfully completed when an acknowledgement of the signal indicating the current location is received;

determining that transmission of the signal indicating the current location has failed when the signal indicating the current location cannot be transmitted, or an acknowledgement is not received although the signal indicating the current location was transmitted; and recording the current location of the mobile terminal as the past location of the mobile terminal if it is determined that transmission of the signal indicating the current location has been successfully completed, and not recording the current location of the mobile terminal as the past location of the mobile terminal if it is determined that the transmission of the signal indicating the current location has failed.

5. The method according to claim 4, further comprising:

changing the threshold based on a location of the mobile terminal.

* * * * *